UNITED STATES PATENT OFFICE.

WILLIAM E. SHAWGER, OF LOS ANGELES, CALIFORNIA, ASSIGNOR TO GEORGE W. ENO RUBBER COMPANY, OF LOS ANGELES, CALIFORNIA, A CORPORATION OF CALIFORNIA.

PROCESS OF ATTACHING RETREADS TO WORN TIRE CASINGS.

1,409,418.     Specification of Letters Patent.     Patented Mar. 14, 1922.

No Drawing.     Application filed September 20, 1920. Serial No. 411,610.

*To all whom it may concern:*

Be it known that I, WILLIAM E. SHAWGER, a citizen of the United States, residing at Los Angeles, in the county of Los Angeles and State of California, have invented new and useful Improvements in Processes of Attaching Retreads to Worn Tire Casings, of which the following is a specification.

My invention relates to a process of applying a retread to the worn outer surface of worn pneumatic vehicle tires, and uniting the parts together to form an integral tire, which will greatly lengthen the wearing qualities of the worn tires.

In the process of uniting a retread to the worn tread of a worn tire, it has heretofore been customary to first properly prepare the tread of the worn tire, then coat its outer surface with a suitable cement, then apply a coating of gum over this cement surface. The inner surface of the retread member is usually coated with cement, and said retread is then forced over the outer surface of the worn tire. When these elements are properly assembled, the whole tire is subjected to heat at a proper temperature and vulcanized together.

During the operation of stretching the retread member over the tread of the worn tire, in the above recited process, the inner surface of the retread member often times sticks to the outer surface of the worn tire tread, due to the frictional resistance, or adhesive tendency, of the gum which is interposed therebetween, to such an extent that great force and the expenditure of an excessive amount of time is required to assemble these elements together in proper adjustment preliminary to the vulcanizing process.

It is the object of my present invention to overcome the above mentioned difficulty by applying a substance, preferably in the form of an anti-frictional powder to the surface of the gum which is interposed between the tread of the tire and the retread member, whereby the frictional or adhesive proclivities of the gum will be overcome, thus permitting of the placement of the retread onto the worn tread surface of tire with a minimum amount of difficulty, said substance being of such nature as to melt and form an integral part of the other elements during a vulcanizing process.

In practice I have found that the following specific steps in my process have proven very efficient. The worn tire is properly prepared by stripping from the outer surface thereof all of the remaining rubber portions, and then thoroughly buffing and cleaning said surface. This surface is then covered with three coats of cement, each coat being allowed to thoroughly dry before the next succeeding coat is applied. After the cement is dry, a sheet of cushion rubber is applied to this cement surface.

The inside surface of the retread member is thoroughly buffed and cleaned and three coats of cement are applied thereto and allowed to dry in a similar manner to that on the tire surface.

The surface of the cushion gum and the inner surface of the retread member are both lightly covered with a thin coating of a substance preferably of an anti-frictional nature, said substance being of such character as to melt at a temperature of approximately 280 degrees Fahrenheit. I have found that many metallic gaseous and liquid substances such as sulphur, antimony sulphides, aniline, formaldehyde etc., are admirably adapted for this purpose, and that a convenient and efficient way of applying the same is to form the substance into a fine powder and dust it onto the surface in a thin film, through the meshes of a cloth bag.

The retread is then slipped in place onto the tire, and by reason of the powdered surfaces this operation may be performed both quickly and without difficulty.

After the elements have been assembled as above described, the whole assembled tire is subjected to a vulcanizing process, thus causing the powdered substance, as well as the cushion gum to melt and become an integral part of the other members, thus producing a retreaded tire having substantially the same efficiency as a new one.

What I claim is:—

1. The herein described process of retreading worn vehicle tires, comprising coating the outer surface of the tire and the inner surface of the tread with a liquid cement, applying a layer of gum to the surface of the worn tire, covering the surface of the gum with a substance which will melt during a vulcanizing process; then applying the tread to the tire, and finally subjecting the whole to a vulcanizing process to unite the re-tread to the surface of the worn tire.

2. The herein described process of re-treading worn vehicle tires, comprising coating the outer surface of the worn tire and the inner surface of the re-tread with a liquid cement, then applying a layer of adhesive gum to the worn tire, then covering the surface of the gum with a mineral substance which will melt at a temperature of approximately 280 degrees Farhenheit, then applying the re-tread to the worn tire, and finally subjecting the whole to a vulcanizing process.

3. The process of applying a re-tread to a worn tire, which consists of applying to the outer surface of the worn tire and the inner surface of the re-tread, a plurality of coatings of cement, and allowing each coat to dry before applying the next succeeding coat, then applying a layer of cushion gum to the outer surface of the worn tire, then applying a mineral powder to the surface of said layer of gum and the inner cement coated surface of the re-tread, then applying the re-tread to the tire, and finally subjecting the whole to a vulcanizing process.

4. The process of applying a re-tread to a worn tire, which consists in removing all of the worn rubber from the surface of said tire and thoroughly buffing and cleaning the outer surface of the worn tire, and the inner surface of the re-tread, then applying to the outer surface of the worn tire and the inner surface of the re-tread a plurality of coats of liquid cement and allowing each coat to dry before applying the next succeeding coat, then applying a sheet of cushion rubber to the worn tire surface, then dusting the inner cement coated surface of the re-tread and the surface of said cushion gum with a mineral powder which will melt at a temperature of approximately 280 degrees Fahrenheit, applying the re-tread to the tire, and finally subjecting the whole to a vulcanizing process.

5. The herein described process of re-treading worn vehicle tires, comprising the application of a layer of gum to the tread surface of the worn tire, coating the surface of the gum with a substance that will prevent accidental sticking of the re-tread member when applied to worn tire, applying the re-tread to the worn tire and finally vulcanizing the members together to form an integral mass.

6. The herein described process of re-treading worn vehicle tires, comprising the application of a layer of cushion gum to the tread surface of the worn tire, covering the surface of the gum with a mineral powder to prevent accidental adhesion of the re-tread member when applied to the worn tire, applying the retread to the worn tire, and finally vulcanizing the re-treaded tire.

7. The herein described process of re-treading worn vehicle tires, comprising the application of an adhesive substance to the outer periphery of the worn tire, coating the adhesive substance with a substance that will prevent accidental adhesion when the re-tread member is applied to the worn tire, the said substance possessing the quality of melting at a vulcanizing temperature, and finally vulcanizing the re-tread member to the worn tire.

In witness that I claim the foregoing I have hereunto subscribed my name.

WILLIAM E. SHAWGER.